United States Patent
Terakawa

[15] 3,681,714
[45] Aug. 1, 1972

[54] IMPEDANCE TRANSFORMERS FOR MICROWAVE TRANSMISSION LINES

[72] Inventor: Takashige Terakawa, Yokohama, Japan

[73] Assignee: Tokyo Keiki Seizosho Co., Ltd., Tokyo, Japan

[22] Filed: March 4, 1970

[21] Appl. No.: 16,539

[30] Foreign Application Priority Data

March 6, 1969 Japan..........................44/19824

[52] U.S. Cl.....................333/21 R, 333/27, 333/33, 333/98 TN
[51] Int. Cl..........H01p 1/06, H01p 5/08, H03h 7/38
[58] Field of Search.......333/98 TV, 98 R, 21, 27, 33

[56] References Cited

UNITED STATES PATENTS 2,962,677  11/1960  Edwards.....................333/98 X

Primary Examiner—Herman Karl Saalbach
Assistant Examiner—Marvin Nussbaum
Attorney—George B. Oujevolk

[57] ABSTRACT

In an impedance matching transformer for a microwave transmission line wherein a pair of orthogonal rectangular waveguides are joined by a rotatable coaxial line including an inner conductor protruding into the interior of one of the waveguides to act as an impedance matching probe, an adjustable screw is provided through a wall of the one waveguide positioned right above the probe to attain impedance matching.

3 Claims, 8 Drawing Figures

IMPEDANCE TRANSFORMERS FOR MICROWAVE TRANSMISSION LINES

This invention relates to an impedance transformer for a microwave transmission line and more particularly to an impedance transformer suitable for use to connect a rotary type coaxial line with a rectangular waveguide utilized as a feeder line to a ship or aircraft-borne radar antenna, for example.

For the sake of description, the invention will be discussed hereinunder as applied to the feeder line to a shipborne radar antenna. A microwave frequency band of 9,375 MHz (3.2 cm in wavelength) is generally assigned for radar communication of ships and a square or rectangular waveguide is generally used as the transmission line of wave energy. As is well known in the art, in a ship-borne radar antenna, it is necessary to frequently vary the direction of transmission and reception of the radar beam. For this reason, it is necessary to provide a rotary joint such as a rotary coaxial line in the feeder line to the antenna.

FIGS. 1 and 2 show a typical construction of an impedance transformer which heretobefore has been used in a microwave transmission line utilized as a feeder to a ship-borne radar antenna. As shown, a short-circuiting plate 2 is provided at one end of a first rectangular waveguide 1 and at a portion of a broad side surface thereof spaced apart from the short-circuiting plate 2 by a predetermined distance is formed a circular opening 3a. To the bottom of the side surface of the waveguide 1 perforated with the opening 3a is joined in an airtight fashion by means of electric welding, for example, a flat end of a first ring-shaped outer conductor 4 having a central bore 3b coaxial with and of the same diameter as the circular opening 3a, the conductor 4 forming a rotary coaxial line together with a second ring-shaped outer conductor 5. The opposite end surface of the outer conductor 4 is recessed to rotatably receive an axial projection of the second outer conductor 5 which is also provided with a central bore 3c coaxial with and of the same diameter as bores 3a and 3b. A second rectangular waveguide 6 is hermetically connected to the outer end surface of the second outer conductor 5 as by electric welding.

An inner conductor 8 extends through the center of opening 3a and bores 3b and 3c to project into the first rectangular waveguide 1. The inner end 7 of the conductor 8 is spaced apart from the short-circuiting plate 2 by a distance d and the obtusely bent outer end portion of the conductor 8 hermetically extends to the outside through a hole previously formed in the wall of the second waveguide 6. The inner conductor 8 serves as an impedance matching probe and its inner end 7 is made spherical to reduce electric spark between it and a wall portion of the waveguide 1 facing thereto and to reduce its inductive reactance to facilitate impedance matching. There is provided a slit so shaped as to minimize the leakage of wave energy and to act as a type of choke at the joint between the first and second outer conductors 4 and 5.

In the microwave transmission line of the type above-described, the joined portions between the first and second rectangular waveguides 1 and 6 and the first and second outer conductors 4 and 5 act as an impedance transformer (generally the impedance of the rectangular waveguide is higher than that of the coaxial line comprised of the inner and outer conductors 4, 5 and 8.). Thus, the effectiveness of the impedance transformation or impedance matching of the transformer is the most important factor.

In the prior art impedance transformer for microwave transmission lines constructed as above described, the impedance matching is effected by accurately determining the height of the inner end 7 of the inner conductor 8 protruding into the first rectangular waveguide 1 and the distance between the inner end 7 of the inner conductor 8 and the short-circuiting plate 2.

With such an impedance matching means, however, it has been difficult not only to manufacture component parts of uniform dimensions but also to accurately assemble them so that this construction is not suitable for mass production.

To provide simple adjustment of the impedance matching, the short-circuiting plate 2 was made adjustable along the length of the waveguide 1 and secured thereto by brazing or welding after proper matching has been realized. Alternatively, a matching iris or adjustable screw (not shown) was threaded through a wall portion of the waveguide 1 on the side of the inner conductor 8 opposite to the short-circuiting plate 2 at a suitable distance from the inner conductor 8.

However, where the short-circuiting plate 2 is made adjustable and is brazed at the adjusted position, the impedance matching will be affected. On the other hand, the matching iris or adjustable screw does not result in the true impedance matching of the impedance transformer itself but merely provides an apparent impedance matching by forming a local portion of high Q at the portion of the first waveguide where the screw is provided. Moreover, due to the presence of such a screw, a local constriction of the field occurs at this portion of high Q during transmission of the wave energy thus reducing the maximum allowable power transmitted.

It is an object of this invention to provide an improved impedance transformer for a microwave transmission line according to which the most desirable impedance matching can be readily attained by a very simple impedance matching adjusting mechanism.

In accordance with this invention in the impedance transformer of the type described above, an adjustable screw is provided through the wall portion of the first rectangular waveguide lying right above the impedance matching probe or the inner end of the inner conductor of the coaxial line to provide the best impedance matching condition.

This invention can be more fully understood from the following detailed description when taken in connection with reference to the accompanying drawings, in which.

Figure 1:
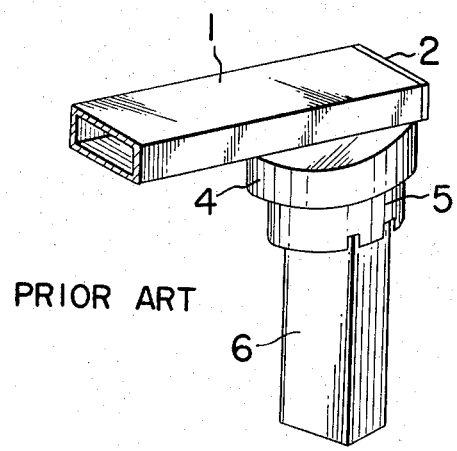
FIG. 1 is a perspective view of a prior art impedance transformer for a microwave transmission line.
Figure 2:
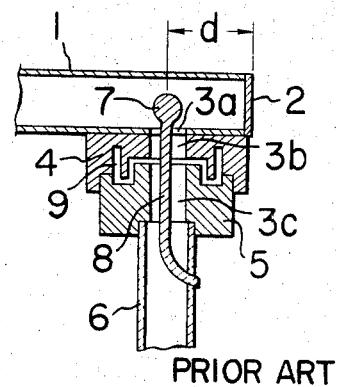
FIG. 2 is a longitudinal sectional view of the impedance transformer shown in FIG. 1.
Figure 3:
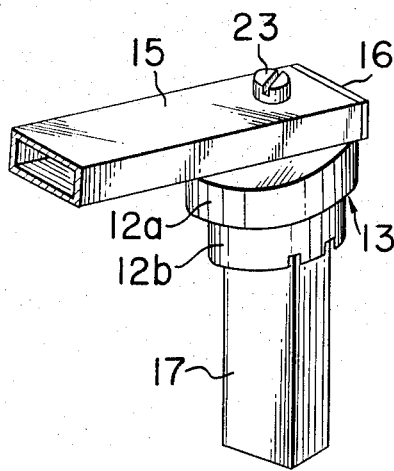
FIG. 3 is a perspective view of one embodiment of the impedance transformer for a microwave transmission line of this invention.
Figure 4:
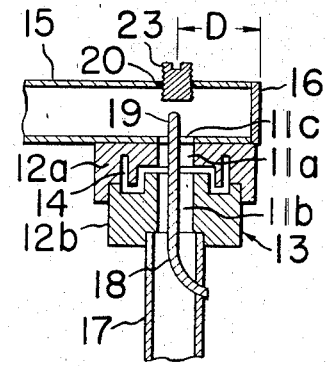
FIG. 4 is a longitudinal sectional view of the impedance transformer shown in FIG. 3.
Figure 5:
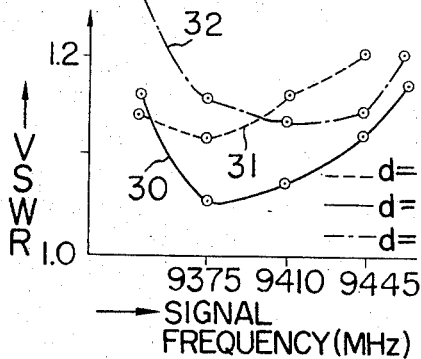
Figure 6:
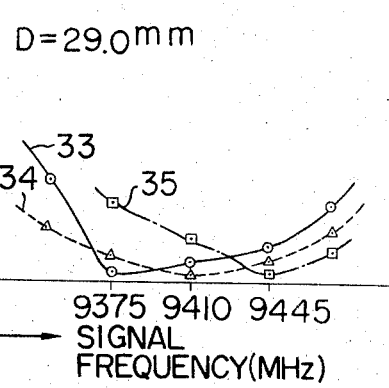
Figure 7:
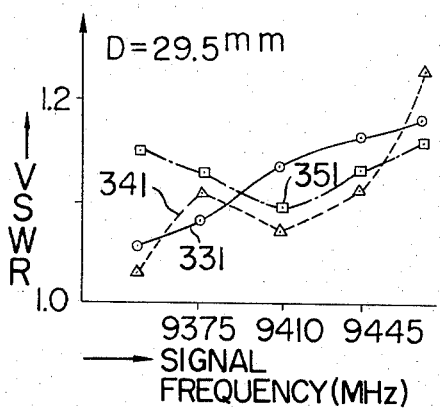
Figure 8:
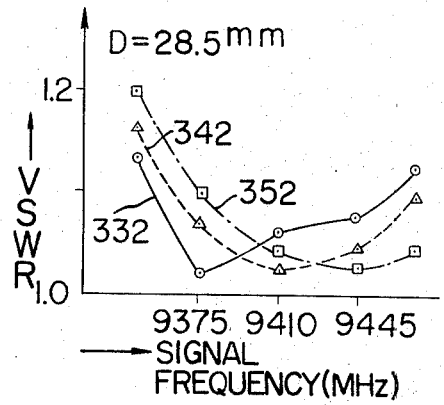

FIG. 5 is a plot of wave frequency vs. voltage standing wave ratio of the prior art impedance transformer shown in FIGS. 1 and 2; and FIGS. 6, 7 and 8 are plots of wave frequency vs. voltage standing wave ratio of the impedance transformer shown in FIGS. 3 and 4.

In one embodiment of the invention shown in FIGS. 3 and 4, a first and a second ring-shaped conductor 12a and 12b and an inner conductor 18 extending through their coaxial bores 11a and 11b correspond to elements 4, 5 and 8 of FIG. 2 and are constructed similar thereto to form a coaxial line 13. A slit 14 similar to the slit 9 is formed at the joint between conductors 12a and 12b to minimize the leakage of the wave energy at this joint.

A first rectangular waveguide 15 is suitably connected on the upper surface of the first outer conductor 12a while a second rectangular waveguide 17 is connected to the lower end of the second outer conductor 12b at right angles to the axis of the first waveguide 15. At the bottom wall of the waveguide 15 is provided an opening 11c coaxial with the bores 11a and 11b. One end of the waveguide 15 spaced from the axis of the opening 11c is closed by a short-circuiting plate 16. The inner conductor 18 of the coaxial line also functions as a probe for impedance matching and is comprised by a rod of copper or brass, for example. The upper end of the inner conductor 18 protrudes into the interior of the first rectangular waveguide 15 at a point spaced apart from the short-circuiting plate 16 by a predetermined distance d.

Right above the upper end 19 of the inner conductor 18 is provided an adjustable screw 23 threaded to an opening 20 in the upper side wall of the first rectangular waveguide. The adjustable screw is made of copper or brass, for example.

With this construction, the inner conductor 18 generally manifests an inductive reactance to the transmitted wave, whereas the adjustable screw 23 a capacitive reactance coupled to the inductive reactance. Strictly speaking, the adjustable screw 23 is worked to control the inductive reactance and capacitive reactance so as to provide a resonance for the transmitted wave, thereby to realize the true or most desirable impedance matching of the transformer. This construction permits more easy and positive impedance matching than the prior impedance transformer shown in FIGS. 1 and 2 without requiring the position and height of the protruded end of the inner conductor 18, and the spacing D thereof from the short circuiting plate 16 to be so rigidly accurate as in the past. This not only improves electrical characteristics but also simplifies the fabrication of the impedance transformer so that the impedance transformer can be produced on the mass production basis.

FIGS. 5 to 8 are plots of wave frequency vs. voltage standing wave ratio to compare electrical characteristics of the prior art impedance transformer shown in FIGS. 1 and 2 and of the impedance transformer embodying this invention. More particularly, FIG. 5 shows characteristic curves of a prior art impedance transformer designed to provide the best impedance matching condition for a transmission signal of 9,375 MHz. Curve 30 shows the wave frequency vs. voltage standing wave ratio characteristic curve for $d$ (spacing between the inner end 7 of the inner conductor 8 and the short-circuiting plate 2) = 9.39 mm (the best matching condition) while curves 31 and 32 show those for $d$ = 9.29 mm and $d$ = 9.49 mm, respectively or where the spacing is decreased or increased by 0.1 mm.

FIG. 6 shows the wave frequency vs. voltage standing wave ratio characteristic curves of this invention.

In curves 33, 34 and 35 best matching points were adjusted to wave frequencies of 9,375 MHz, 9,410 MHz and 9,445 MHz, respectively, by the adjustable screw 23, with the spacing D between the adjustable screw 23 and the short-circuiting plate 16 set to 29.0 mm (the best matching condition). FIGS. 7 and 8 show similar curves for $D$ = 29.5 mm and $D$ = 28.5 mm respectively. In FIGS. 7 and 8 curves corresponding to curves 33, 34 and 35 in FIG. 6 are shown by reference numerals 331, 341, 351 and 332, 342, 352, respectively.

By methods known in the art, one of the rectangular waveguides may be connected to a microwave source and the other to a ship-borne radar antenna.

What is claimed is:

1. In an impedance matching transformer for a microwave transmission line wherein a pair of orthogonal rectangular waveguides are joined by a rotatable coaxial line including an inner conductor protruding into the interior of one of said waveguides through a broad wall thereof perpendicularly to said broad wall to act as an impedance matching capacitive probe, the improvement therein which comprises having an adjustable screw extending through the opposite wall of said one waveguide and coaxially with said probe, said screw being adjustable to establish impedance matching at the joint between said waveguides.

2. An improvement according to claim 1 wherein one end of said one waveguide is closed by a short-circuiting plate at a predetermined distance from said probe and said adjustable screw.

3. An improvement according to claim 1 wherein said rotatable coaxial line comprises a first outer conductor secured to said one waveguide and a second outer conductor secured to the other waveguide, the joint between said first and second outer conductors being provided with a slit so shaped as to minimize the leakage of wave energy at said joint.

* * * * *